US007587364B2

(12) United States Patent
Crumbach et al.

(10) Patent No.: US 7,587,364 B2
(45) Date of Patent: Sep. 8, 2009

(54) SYSTEMS AND METHODS FOR BANK DETERMINATION AND PAYMENT HANDLING

(75) Inventors: Manfred Crumbach, Wiesloch (DE); Christiane Konstandin, Walldorf (DE); Sascha Hafner, Karlsruhe (DE); Christian Auth, Mannheim (DE)

(73) Assignee: SAP AG, Walldorf (DE)

( * ) Notice: Subject to any disclaimer, the term of this patent is extended or adjusted under 35 U.S.C. 154(b) by 582 days.

(21) Appl. No.: 11/387,919

(22) Filed: Mar. 24, 2006

(65) Prior Publication Data

US 2007/0226139 A1 Sep. 27, 2007

(51) Int. Cl.
*G06Q 40/00* (2006.01)
(52) U.S. Cl. .............................. 705/40; 705/38; 705/36; 705/35
(58) Field of Classification Search ............... 705/35–44
See application file for complete search history.

(56) References Cited

U.S. PATENT DOCUMENTS

| 5,978,780 | A | | 11/1999 | Watson | |
|---|---|---|---|---|---|
| 6,021,397 | A | * | 2/2000 | Jones et al. | 705/36 R |
| 6,594,647 | B1 | * | 7/2003 | Randle et al. | 705/77 |
| 6,832,212 | B1 | | 12/2004 | Zenner et al. | |
| 6,968,319 | B1 | | 11/2005 | Remington et al. | |
| 2001/0042785 | A1 | * | 11/2001 | Walker et al. | 235/379 |
| 2004/0117302 | A1 | * | 6/2004 | Weichert et al. | 705/40 |

OTHER PUBLICATIONS

Defense Federal Acquisition Regulation Supplement; Electronic Submission and Processing of Payment Requests (DFARS Case 2005-D009) The Federal Register / Find. Lanham: Mar. 21, 2006. vol. 71, Iss. 054; p. 14149.*
"Bank Selection," (1 page) available at http://help.sap.com/saphelp_erp2004/helpdata/en/01/a9bef3455711d182b40000e829fbfe/content.htm, last accessed on Mar. 23, 2006.
"Notes on Payment Method," (1 page) available at http://help.sap.com/saphelp_erp2004/helpdata/en/01/a9becc455711d182b40000e829fbfe/content.htm, last accessed on Mar. 23, 2006.

* cited by examiner

*Primary Examiner*—Frantzy Poinvil
*Assistant Examiner*—Clement Graham
(74) *Attorney, Agent, or Firm*—Finnegan, Henderson, Farabow, Garrett & Dunner LLP

(57) ABSTRACT

Systems and methods are provided for automated payment handling. In one implementation, a method is provided for processing of a payment request. The method may include determining, using the payment request, an entity that will receive a payment, and determining an outgoing bank account to use for the payment. Further, the method may include automatically selecting, from a list of available payment procedures, a preferred payment procedure for the payment request, the preferred payment procedure indicating a payment form code and a connection with the entity. Moreover, the method may include validating the preferred payment procedure using a set of rules and paying, to the entity, the payment using the validated payment procedure.

20 Claims, 13 Drawing Sheets

| Country Group | Countries | Domestic | Text |
|---|---|---|---|
| Euro | DE, LU, FR, ES ... | | European Bank Transfer |
| EFTA | Euro, CA, ... | | EFTA Countries |
| DOM-CH | | Yes | Domestic Bank Transfer, Switzerland, Liechtenstein |

| Payment Form Code | Partner Bank Account Mandatory | Partner Bank Address Mandatory | Payment Direction | Text |
|---|---|---|---|---|
| Bank Transfer | True | | Outgoing | Bank Transfer |
| Check | | True | Outgoing | Check |
| Direct Debit | True | | Incoming | Direct Debit |

| | 505 | 330 | 515 | 520 | 525 |
|---|---|---|---|---|---|
| | Payment Procedures | Domestic | Country Group From | Country Group To | Priority |
| 530 | Domestic Bank Transfer | Yes | | | 1 |
| 535 | Euro Bank Transfer | | Euro | EFTA | 2 |
| 540 | International Bank Transfer | | | | 3 |
| 545 | Bank Check | | | | 4 |
| 550 | Paper Check | | | | 5 |

| 610 | 505 | 410 | 525 |
|---|---|---|---|
| Country | Payment Procedure | Payment Form Code | Priority |
| DE | Domestic Bank Transfer | Bank Transfer | 1 |
| DE | Euro Bank Transfer | Bank Transfer | 2 |
| DE | International Bank Transfer | Transfer | 3 |
| DE | Bank Check | Check | 4 |
| DE | Paper Check | Check | 5 |

| Company | Priority | Sub-Priority | Payment Procedure | House Bank Account |
|---|---|---|---|---|
| SAP AG | 1 | P1 | Domestic Bank Transfer | * |
| SAP AG | 2 | P1 | Domestic Bank Transfer | DRE 0002 |
| SAP AG | 3 | P1 | Domestic Bank Transfer | SPK 0007 |
| SAP AG | 4 | P2 | Euro Bank Transfer | DRE 0002 |
| SAP AG | 5 | P3 | International Bank Transfer | DRE 0005 |

110 — Company
525 — Priority
720 — Sub-Priority
505 — Payment Procedure
730 — House Bank Account
740, 750, 760, 770, 780

FIG. 8
800

| Company | Business Partner | Currency | Min | Max | Payment Procedure | House Bank Account |
|---|---|---|---|---|---|---|
| SAP AG | * | USD | * | * | * | DRE 0002 |
| SAP AG | BP 0001 | USD | * | * | Check | SPK 0007 |
| SAP AG | * | EUR | 1000 | 5000 | * | SPK 0007 |

110 — Company
120 — Business Partner
810 — Currency
820 — Min
830 — Max
505 — Payment Procedure
730 — House Bank Account
840, 850, 860

SYSTEMS AND METHODS FOR BANK DETERMINATION AND PAYMENT HANDLING

TECHNICAL FIELD

The present invention generally relates to the field of payment handling. More particularly, the invention relates to computerized systems and methods for payment handling that allow selection of bank accounts to utilize for automatic payments.

BACKGROUND INFORMATION

Electronic automated payment systems may be used to reduce the complexity of making payments to individuals and companies. Individuals may pay for items, purchases, and services automatically using electronic payment procedures such as direct debit with a bank account. For example, individuals may make an automated payment from a checking account for monthly utilities.

A company may have a number of business partners with which the company regularly does business. For example, a manufacturer of goods may routinely do business with a shipper who delivers goods, and the manufacturer must make a number of payments to the shipper in exchange for delivering the goods. As a result, companies, such as the manufacturer, may establish electronic payment procedures with their business partners, such as the shipper, to debit a bank account upon shipment or receiving of a good.

Current automated payment systems require users to configure the electronic payment system before using it. Requiring an individual to configure direct debiting of a checking account for a utility bill may not be difficult. However, as the number and complexity of transactions increase, requiring a user to configure the payment system can be burdensome and lead to errors. Companies and their business partners may use multiple bank accounts for different transactions. Further, the companies, business partners, and banks may be located in one or more countries, requiring a user to be aware of the laws and regulations governing bank transactions in each country. Companies also may not be aware that performing a transaction, such as a wire bank transfer between two banks located in different countries, may require payment of additional fees for the wire bank transfer. As a result, when a company is performing thousands of transactions, the fees can total a large sum.

In view of the foregoing, there is a need for computer-implemented systems and methods that allow automated payment handling which provides default, but customizable, prioritizations for choosing bank accounts and payment procedures. There is also a need for computer-implemented systems and methods that allow a user to simulate changes to their payment system to visualize the outcome of a chosen configuration.

SUMMARY

Consistent with embodiments of the invention, systems and methods are provided for payment handling. With such embodiments, payment handling may be provided with selection of one or more bank accounts and payment procedures to utilize for automatic payments.

In accordance with one embodiment, a method is provided for automated payment handling. In one implementation, a method is provided for processing of a payment request. The method may include determining, using the payment request, an entity that will receive a payment, and determining an outgoing bank account to use for the payment. Further, the method may include automatically selecting, from a list of available payment procedures, a preferred payment procedure for the payment request, the preferred payment procedure indicating a payment form code and a connection with the entity. Moreover, the method may include validating the preferred payment procedure using a set of rules and paying, to the entity, the payment using the validated payment procedure.

According to another embodiment, a system is provided for automated payment handling. The system may be provided for processing a payment request. The system may include means for determining, using the payment request, an entity that will receive a payment, and means for determining an outgoing bank account to use for the payment. Further, the system may include means for automatically selecting, from a list of available payment procedures, a preferred payment procedure for the payment request, the preferred payment procedure indicating a payment form code and a connection with the entity. Moreover, the system may include means for validating the preferred payment procedure using a set of rules and means for paying, to the entity, the payment using the validated payment procedure.

Consistent with an embodiment of the invention, computer programs may also be provided with program coding means which are suitable for carrying out methods and implementing systems consistent with the invention, as described herein, when the computer program is run on a computer.

Additional objects and advantages of the invention will be set forth in part in the description which follows, and in part will be obvious from the description, or may be learned by practice of embodiments of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments of the invention and together with the description, serve to explain the principles of the invention. In the drawings:

FIG. 3 illustrates an exemplary table identifying country groups, consistent with an embodiment of the present invention;

FIG. 4 illustrates an exemplary table identifying payment form codes, consistent with an embodiment of the present invention;

FIG. 5 illustrates an exemplary table of payment procedures, consistent with an embodiment of the present invention;

FIG. 6 illustrates an exemplary table of prioritized payment procedures for a given country, consistent with an embodiment of the present invention;

FIG. 7 illustrates an exemplary table of prioritized payment procedures for a given company based on a payment procedure and a house bank account, consistent with an embodiment of the present invention;

FIG. 8 illustrates an exemplary table of additional parameters that a user of an automated payment system may configure, consistent with an embodiment of the present invention;

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
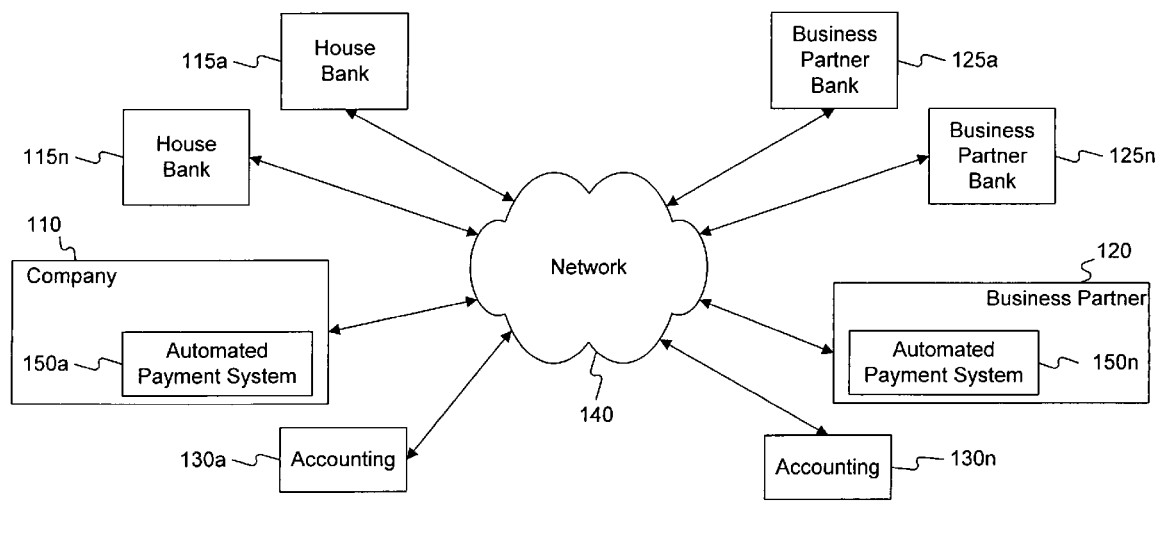
FIG. 1 illustrates an exemplary system, including an automated payment system, consistent with an embodiment of the present invention.

FIG. 1 illustrates an exemplary system 100, consistent with an embodiment of the present invention. System 100 may include a company 110, house banks 115a-n, a business partner 120, business partner banks 125a-n, accounting systems 130a-n, a network 140, and automated payment systems 150a-n. Company 110 and business partner 120 may each include automated payment system 150a. Alternatively, only company 110 may include automated payment system 150a. Automated payment system 150a may be installed as software on a server run by company 110, and automated payment system 150n may be installed as software on a server run by business partner 120. As will be appreciated by those skilled in the art, one or more of the components illustrated in FIG. 1 may be implemented with or include any suitable combination of hardware, software, and/or firmware to provide the functionality and features described herein. Moreover, one or more of the components illustrated in FIG. 1 may be implemented on a single server, or distributed throughout system 100.

System 100 may allow entities, such as company 110 and business partner 120, to establish automated payment handling. Company 110 may utilize one or more house banks 115a-n to handle their banking needs. House banks 115a-n may be a bank with which company 110 maintains one or more accounts. For example, company 110 may utilize a bank account from one house bank 115a for incoming payments and a bank account from another house bank 115n for outgoing payments. While the example of FIG. 1 is illustrated with two house banks 115, company 110 may use any number of house banks. Company 110 may also use house banks 115a-n and house bank accounts depending on the location of business partner 120, business partner banks 125a-n, and the nature of the transaction between company 110 and business partner 120.

Company 110 may have one or more business partners 120, which may use one or more business partner banks 125a-n to manage their banking needs. Each business partner bank 125 may include a plurality of bank accounts for business partner 120. Each business partner 120 may also have additional business partners (not shown in FIG. 1).

Company 110 and business partner 120 may utilize one or more accounting systems 130a-n to maintain complete business records. For example, accounting systems 130a-n may record incoming and outgoing transactions from house banks 115 and business partner banks 125, record payments made to employees of company 110 and business partner 120, track inventory of company 110 and business partner 120, and handle other requests necessary to maintain accounting records.

Automated payment systems 150a-n may be used by company 110 and business partner 120 to select a house bank 115 and a business partner bank 125 for a payment request. A payment request may indicate, for example, that company 110 has to pay money to a business partner 120, or that company 110 has to draw money from a business partner 120. As described below, company 110 may initiate a payment request and use automated payment systems 150a-n to automatically fill in missing payment attributes into the payment request.

Automated payment systems 150a-n may include built-in defaults, as described below, so that extensive configuration of the system is not required by employees of company 110 and business partner 120. Company 110 may define, for example, their business partners 120, house banks 115, and house bank accounts for each house bank 115. Once this information is defined, customers may utilize automated payment systems 150a-n without having to further configure each automated payment system. Business partner 120 may provide a payment request to company 110. The payment request may be originated, for example, by automated payment system 150n, manually by a user at company 110, or by another payment request system of the company or a business partner. Automated payment system 150n may initiate the payment request upon receipt of an invoice from a business partner or upon issuance of an invoice to a business partner. At least one of the automated payment systems 150 may determine the house bank 115 and house bank account to use for the payment, determine the manner in which to make the payment, and determine the business partner bank 125 and business partner bank account that should receive the payment.

Automated payment systems 150a-n may be implemented by or on behalf of company 110 and business partner 120. In one embodiment consistent with the invention, company 110 and business partner 120 may use the same automated payment system 150a, such as where automated payment system 150a is implemented using a server maintained by a third party. For example, a third party may use automated payment system 150 to initiate a payment for company 110 or business partner 120. The third party may maintain custom settings for filling the payment request for each of company 110 and business partner 120. Automated payment system 150 may be included within or installed into existing enterprise software, such as SAP Enterprise Resource Planning (ERP), commercially available from SAP AG (Walldorf, Germany), and other accounting software such as Quicken and Navision.

While illustrated as using separate banks, company 110 and business partner 120 may maintain accounts at the same bank. Moreover, company 110, house banks 115, business partners 120, business partner banks 125, accounting systems 130, and automated payment systems 150 may be located in one or more different countries. Further, company 110 and business partner 120 may also have a plurality of locations, such as a plurality of manufacturing plants, headquarters, distribution sites, and the like.

Company 110, house banks 115, business partner 120, business partner banks 125, accounting systems 130, and automated payment systems 150 may be connected over network 140. Network 140 may be a wireless or wired communication network, such as over a local area network, a wide area network, an intranet, the Internet, and the like. In another embodiment consistent with the invention, one or more systems 100 may be contained within a single system. In addition, traditional connections may be established using regular mail in system 100, for example, by mailing a check to a business partner 120 when mail is the most cost-effective solution.

Figure 2:
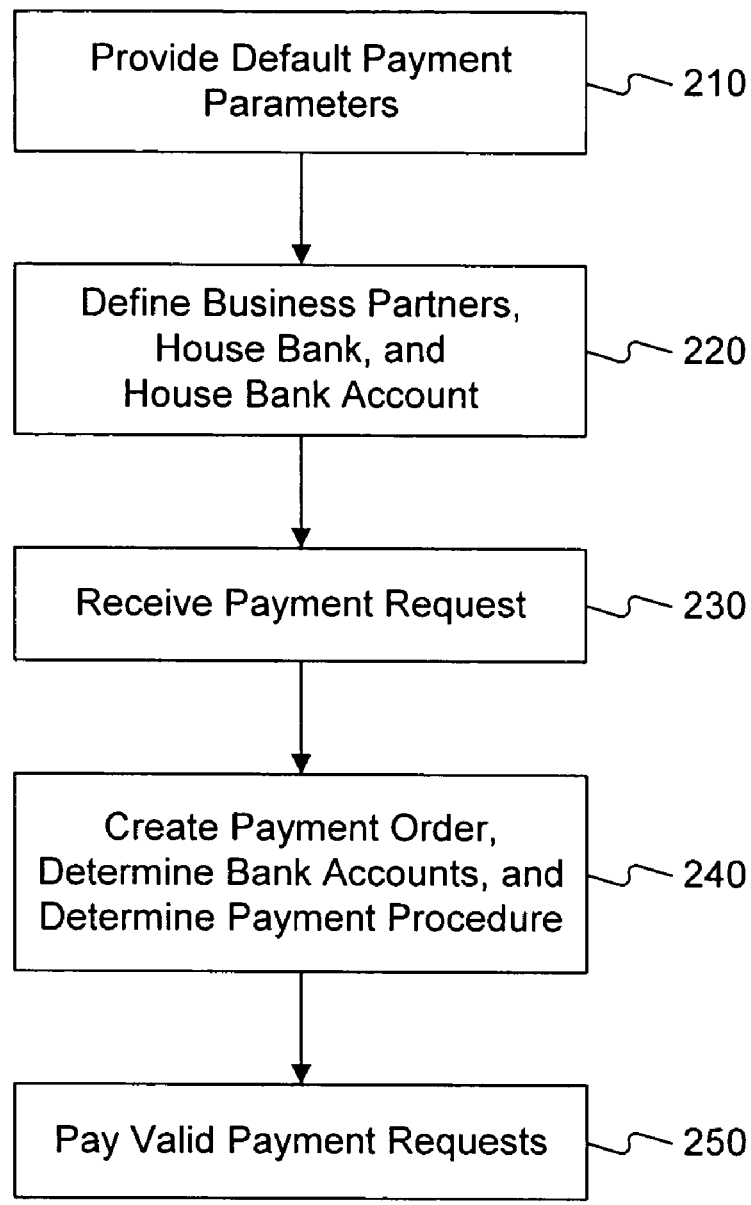
FIG. 2 illustrates a flowchart of an exemplary method for establishing and using an automated payment system, consistent with an embodiment of the present invention.

FIG. 2 is a flowchart of an exemplary method for establishing and using an automated payment system, consistent with an embodiment of the present invention. For purposes of illustration, the embodiment of FIG. 2 will be described with reference to system 100 of FIG. 1.

At step 210, automated payment system 150 may create default payment parameters for use in payment handling. This may occur before automated payment system 150 is delivered to company 110 or business partner 120, during an initial configuration of automated payment system 150a. In this manner, automated payment system 150 may be used immediately upon receipt. These default payment parameters may include, for example, country groups, payment form codes, and payment procedures. In one embodiment consistent with the invention, company 110 may include automated payment system 150a, but business partner 120 may not include automated payment system 150n.

A country group may be used to group together countries having similar payment handling procedures. Many countries allow for only certain types of payment procedures, or may require that the house bank 115 and business partner bank 125 be located in the same country in order to allow bank transfers. Country groups may therefore be used to ensure proper payment handling between banks located worldwide. Country groups will be described in more detail with reference to FIG. 3 below, and may be provided with automated payment system 150.

Payment form codes may be provided to describe the manner in which a payment is made. For example, a payment may be made by a bank account transfer, a check, direct debit, using a credit card, cash, and the like. Automated payment system 150 may store all possible payment form codes, and include a standard set of payment form codes that a user will not have to configure. Payment form codes will be described in more detail with reference to FIG. 4 below, and may be provided with automated payment system 150.

Payment procedures may describe a specific kind of payment. Some payments are only valid in certain countries, or may only be used in combination with banks in specific countries. Payment procedures may be linked with country groups to ensure that automated payment system 150 selects a valid payment procedure for house bank 115 and business partner bank 125. Payment procedures may also be prioritized, for example, based on the country groups, so that automated payment system 150 selects the most efficient payment procedure. Payment procedures will be described in more detail with reference to FIG. 5 below, and may be provided with automated payment system 150.

At step 220, a user of automated payment system 150, such as company 110 or business partner 120, may define business partners 120, house banks 115, and house bank accounts for use in payment handling. This may occur when the user orders automated payment system 150, or once the user receives automated payment system 150. That is, changes may also be made during use of the system. Automated payment system 150 may include a user interface to enable a user to configure and simulate payment procedures. When a user defines business partners 120, a list of all supported payment form codes may be listed. If the business partner 120 supports multiple payment form codes, a user may choose a preferred payment form code. A user may not need to configure a house bank account for each business partner 120 because automated payment system 150 may be provided with default configurations, as described below.

At step 230, automated payment system 150 may receive one or more payment requests. For example, business partner 120 may send a payment request to company 110 requesting that an invoice be paid. The payment request may include, for example, the company 110 or business partner 120 to be paid, the company 110 or business partner 120 that will pay, the payment form code, a bank account to pay the invoice to or from, and a reference to a bank connection of a business partner. The reference to a bank connection of a business partner may be, for example, routing information (e.g., a routing or SWIFT code, account number etc.) for the bank that will receive the payment. The reference may also indicate the account information of the bank that will receive the payment. The information necessary to complete a payment request may be provided by the payment request or derived from payment handling procedures. Alternatively, the reference to a bank connection may not be given, and this may be determined by automated payment system 150 using payment handling procedures described below.

At step 240, automated payment system 150 may create a payment order, determine the bank accounts to use to process the payment order, and determine the payment procedure for the payment order. While automated payment system 150 may be provided with a default configuration, company 110 and business partner 120 may define a preferred payment procedure and house bank account to use for transactions. In this manner, company 110 and business partner 120 may customize automated payment system 150 as desired. Creating a payment order, determining bank accounts to use to process the payment order, and determining a payment procedure for the payment order will be described further below.

At step 250, automated payment system 150 may pay valid payment orders using the determined bank accounts and payment procedures. Payment requests may be paid at a designated time, in a group, or immediately upon determination of the bank accounts and payment procedures.

FIGS. 3 through 8 illustrate exemplary tables containing data that automated payment system 150 may use to select bank accounts and payment procedures for handling a payment order. The data may be stored in any format, such as the illustrated tables, on the server that implements automated payment system 150. Alternatively, the data may be stored separate from the server implementing the automated payment system. For example, company 110 may store the data when automated payment system 150a is maintained by a third party server, and automated payment system 150a may access this data over network 140. The data contained in these tables will first be described, followed by a description of how automated payment system 150 selects bank accounts and payment procedures to use for a payment request.

FIG. 3 illustrates an exemplary table 300 identifying country groups, consistent with an embodiment of the present invention. Automated payment system 150 may consider the country groups of both the house bank 115 and the business partner bank 125 to determine if a chosen payment procedure is valid. A country group 310 may be used to group together one or more countries 320 having similar payment handling procedures. Domestic 330 may indicate if the payment form code must be between banks located in the same country or country group. Text 340 may describe the nature of the transaction.

For example, as illustrated at 350 in FIG. 3, country group 310 may indicate a Euro country group for a European bank transfer, and include a list of countries 320 included within this group, such as Germany (DE), Luxembourg (LU), France (FR), and Spain (ES). Payments in Euro country group 350 may not require a domestic bank transfer, therefore, domestic bank transfer 330 may remain empty. Depending on the direction of the bank transfer, either incoming to a house bank 115 or outgoing from a house bank 115, the country groups may be different. For example, a bank located in France may provide outgoing European bank transfers from the Euro country group 350, but may receive incoming transactions from EFTA country group 360.

As illustrated at 360, country group 310 may indicate an EFTA country group for EFTA countries. Countries 320 included within EFTA may include additional country groups, such as Euro country group 350, as well as countries, such as Canada (CA).

Domestic 330 may be used to indicate if a payment procedure marked as domestic can be used. Domestic bank transfers may be bank transfers between a house bank 115 and a business partner bank 125 that are located in the same country, such as Switzerland (CH). As illustrated at 370, country group DOM-CH may require domestic bank transfers. Domestic bank transfers may also be allowed between different countries in some circumstances, such as between Switzerland and Liechtenstein. The circumstances under which domestic bank transfers may be allowed between different countries may be defined by the rules and regulations of those countries.

Table 300 is intended as exemplary only; many different country groups, countries, and types of bank transfers may be included. A complete listing of country groups and countries may be provided with automated payment system 150 so that a user does not have to configure these items. The lists may take into consideration the rules and regulations of each country for conducting payments to and from banks located within the country.

FIG. 4 illustrates an exemplary table 400 identifying payment form codes 410, consistent with an embodiment of the present invention. Payment form codes 410 may describe the manner in which a payment is made. As indicated at 420, table 400 may indicate whether a partner bank account is mandatory for a given payment form code 410. As illustrated at 430, payment form codes 410 may also require a business partner postal address, such as when payment form code 410 is a check 470 that will be mailed to business partner 120 or business partner bank 125.

Payment direction 440 may indicate the direction of a payment as either incoming to a bank account, or outgoing from a bank account. Text 450 may provide a description of the payment form code. Payment form codes 410 may be generic to avoid country specific configuration, which may be defined by the payment procedure as described below.

As illustrated at 460 and 480 in FIG. 4, payment form codes 410 bank transfer and direct debit may require the partner bank account to be known. In order to make an outgoing bank transfer, the partner bank account must be known to identify the account receiving the bank transfer. Similarly, to request an incoming direct debit, the partner bank account to be debited must be known.

FIG. 4 is exemplary only, as other payment form codes 410 such as credit card, cash, and the like, may be supported. Additional fields may be provided, such as whether a payment form code 410 is self-initiated. Payment form codes 410 may be provided with automated payment system 150, such that a user will not have to configure these items. In one embodiment consistent with the invention, users may not be allowed to change the default payment form codes 410. However, users of automated payment system 150 may add additional payment form codes 410, such as a check that is directly handed to an employee rather than sent to the business partners postal address. Users may also be allowed to select supported payment form codes 410 using a wizard and graphical user interface. For example, Bill of Exchanges are not used by many countries, so a user may be given the option of whether to include this payment form code 410. During system configuration, the payment form codes to be used may be selected, allowing customization for the user of automated payment system 150.

FIG. 5 illustrates an exemplary table 500 of payment procedures 505, consistent with an embodiment of the present invention. Payment procedures 505 may describe a specific kind of payment, including a location of a payment. Some payment procedures 505 may be valid in any country, such as domestic bank transfers. However, some payment procedures 505 are only valid in certain countries, or may only be used in combination with banks in specific countries. Payment procedures 505 may be linked with country groups 310 to ensure that automated payment system 150 selects a valid payment procedure 505 for the house bank 115 and business partner bank 125. If no country group 310 is specified, the payment procedure 505 may be valid worldwide. Payment procedures 505 may also be prioritized, for example, based on country groups 310, so that automated payment system 150 selects the most efficient payment procedure 505.

Table 500 may include fields for payment procedures 505, domestic 330, country group from 515, country group to 520, and a priority 525. Country group from 515 may indicate the country group from which a payment originates (outgoing). Country group to 520 may indicate the country group of the bank which receives the payment (incoming). If only a country group from 515 is provided for a payment procedure 505, the country group to 520 may be the same as country group from 515. If a payment procedure 505 is restricted to a country group 310, the payment procedure 505 may be used only if the house bank 115 and business partner bank 125 are both listed in a country listed in the country group 310.

Payment procedures 505 that are marked as domestic 330, such as domestic bank transfer 530, may be used if the house bank 115 and business partner bank 125 are in the same country. For example, a domestic bank transfer 530 may be used to transfer money between two banks located in France (FR). Payment procedures 505 that are marked as domestic 330 may also be used if a country group 310 exists that is marked as domestic, and both the house bank 115 and business partner bank 125 are within this country group 310. For example, a domestic bank transfer may be used to transfer money between a bank located in Switzerland a bank located in Liechtenstein, because country group 370 (FIG. 3) lists these countries as being within the same domestic country group. However, a domestic bank transfer could not be used to transfer money from a bank located in Germany (DE) to a bank located in France (FR).

Euro bank transfer 535 may receive transfers from banks within Euro country groups 310, and may originate transfers to banks within EFTA country group 520. For example, Euro bank transfer 535 may be used to transfer money from Spain (ES) to France (FR). However, Euro bank transfer 535 may not be used to transfer money from Germany (DE) to the United States of America (USA).

Additional exemplary payment procedures may include international transfer 540, bank check 545, and paper check 550, which may be unrestricted in use.

FIG. 6 illustrates an exemplary table 600 of prioritized payment procedures 505 for a given country 610, consistent with an embodiment of the present invention. As illustrated at 610, Germany (DE) may allow a number of payment procedures 505, each of which has a corresponding payment form code 410. Payment procedures 505 may be prioritized 525 by country to account for different priorities in different countries. For example, domestic bank transfers may avoid additional fees associated with transferring money between different countries. In addition, bank transfers within European countries may have lower fees than international bank transfers. As a result, domestic bank transfers may be given the highest priority of 1, followed by Euro bank transfers, followed by international bank transfers. Bank transfers may also be preferred over checks, which may take longer to process and require fees associated with mailing a check. Therefore, checks may be given lower priority than bank transfers in Germany (DE). A bank check (a priority of 4) may be preferred over a paper check (a priority of 5) because the funds of paper check may take additional time to process and confirm that there are sufficient funds in the account from which the paper check is drawn. Additional payment procedures 505 and prioritizations may be provided, for example, other countries may utilize different prioritizations based on preferences configured by a user and rules and regulations of those countries.

FIG. 7 illustrates an exemplary table 700 of prioritized payment procedures 505 for a given company 110 based on payment procedure 505 and house bank account 730, consistent with an embodiment of the present invention. Company 110 and business partner 120 may define their bank accounts 730 (FIG. 2, step 220), which may include multiple bank accounts for each payment procedure 505. Automated payment system 150 for company 110 may maintain the known business partner bank accounts within the system. For example, as illustrated at 740, 750, and 760, SAP AG may use three different bank accounts for domestic bank transfers. The * listed for house bank account 730 of domestic bank transfer 740 may be used as a wildcard to indicate that entries may be ordered by their own prioritization, as described in further detail below.

As illustrated at 770, another house bank account 730, DRE 0002, may be used for Euro bank transfers. A third house bank account 730, DRE 0005, may be used for international bank transfers, as illustrated at 780.

Company 110 may prioritize payment procedures 505 to include only payment procedures 505 which are possible for at least one house bank account 730 of company 110. If a company 110 has prioritized payment procedures 505, the prioritized payment procedures 505 may be used rather than the prioritized payment procedures based on country (FIG. 6). Alternatively, sub-priority 720 may be used to further prioritize prioritized payment procedures 505 based on country group 310. Sub-priorities may be used to order the possible values when wildcards are used. For example, if domestic bank transfer is the preferred payment procedure 505, but no house bank account 730 is defined within this payment handling entry, then all house bank accounts 730 may be allowed. Because all house bank accounts 730 may have the same priority 525, their own priority may be reflected as a sub-priority 720.

FIG. 8 illustrates an exemplary table 800 of additional parameters that a user of automated payment system 150 may configure, consistent with an embodiment of the present invention. Wildcard * indicates that no restriction exists for this field. Company 110 may wish to use specific payment procedures 505 for special situations. For example, as illustrated at 840, SAP AG may choose to use house bank account 740 DRE 0002 for transactions using currency 810 from the United States. As illustrated at 850, SAP AG may restrict payment procedure 505 to a check for business partner 120 BP 00001, when using currency 810 from the United States. The house bank account 730 from which to withdraw the check may also be restricted to SPK 0007.

As illustrated at 860, SAP AG may provide that transactions in currency 810 from Europe having a minimum 820 amount of 1000 and a maximum 830 amount of 5000 be performed with house bank account 730 SPK 0007. In this manner, company 110 may fully customize payment procedures 505 depending on a variety of parameters.

With exemplary data that automated processing system 150 may use to perform automated payment processing described, the process of interpreting and applying the data to select bank accounts and payment procedures for a payment request will now be provided.

Figure 9:
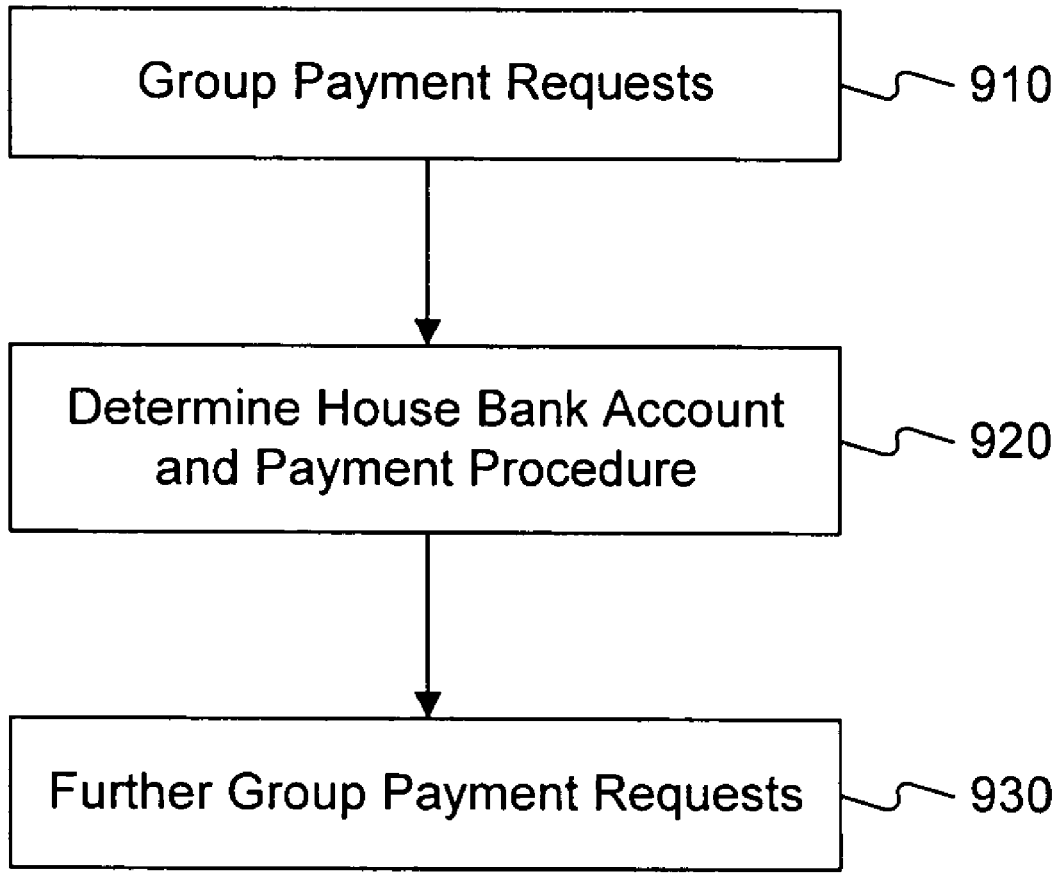
FIG. 9 illustrates a flowchart of an exemplary method for creating a payment order, consistent with an embodiment of the present invention.

FIG. 9 illustrates a flowchart of an exemplary method 900 for creating a payment order (see FIG. 2, step 240), consistent with an embodiment of the present invention. Upon receiving a payment request from a business partner 120 or another company 110, automated payment system 150 may create a payment order to be processed.

At step 910, automated payment system 150 may group similar payment requests. Users of automated payment system 150 may define the fields to use for grouping payment requests, such as if the house bank accounts 730 to be used are the same, the same payment form code 410 is to be used, if the currency types 810 are the same, if the business partner bank accounts are the same, if the payment requests contain the same empty fields, and the like. For example, if automated payment system 150 receives multiple payment requests from the same business partner 120, these payment requests may be grouped together and processed as a single payment order.

Account payments and account receivables may also be grouped together for business partner 120, and the group may be processed as either a payment or a receivable depending on the sum of the grouped payment requests. Users may also define when not to group payment requests, such as if the one payment form code is a bank transfer and another payment form code is a direct debit At step 920, automated payment system 150 may determine a house bank account 730 and a payment procedure 505 to use for the payment request, as described with reference to FIG. 10. The sum of the amounts of the grouped payment request from step 910 may be used.

At step 930, automated payment system 150 may further group payment requests. During processing of the payment request, attributes that may be further grouped may be identified after determination of a house bank account and payment procedure to use for the transaction. For example, once the house bank account is determined, transactions may be further grouped using the same house bank account and business partner bank connection.

In another embodiment consistent with the invention, automated payment system 150 may not group payment requests (steps 910 and 930), but rather may directly process payment requests by determining a house bank account and payment procedure (step 920).

Figure 10:
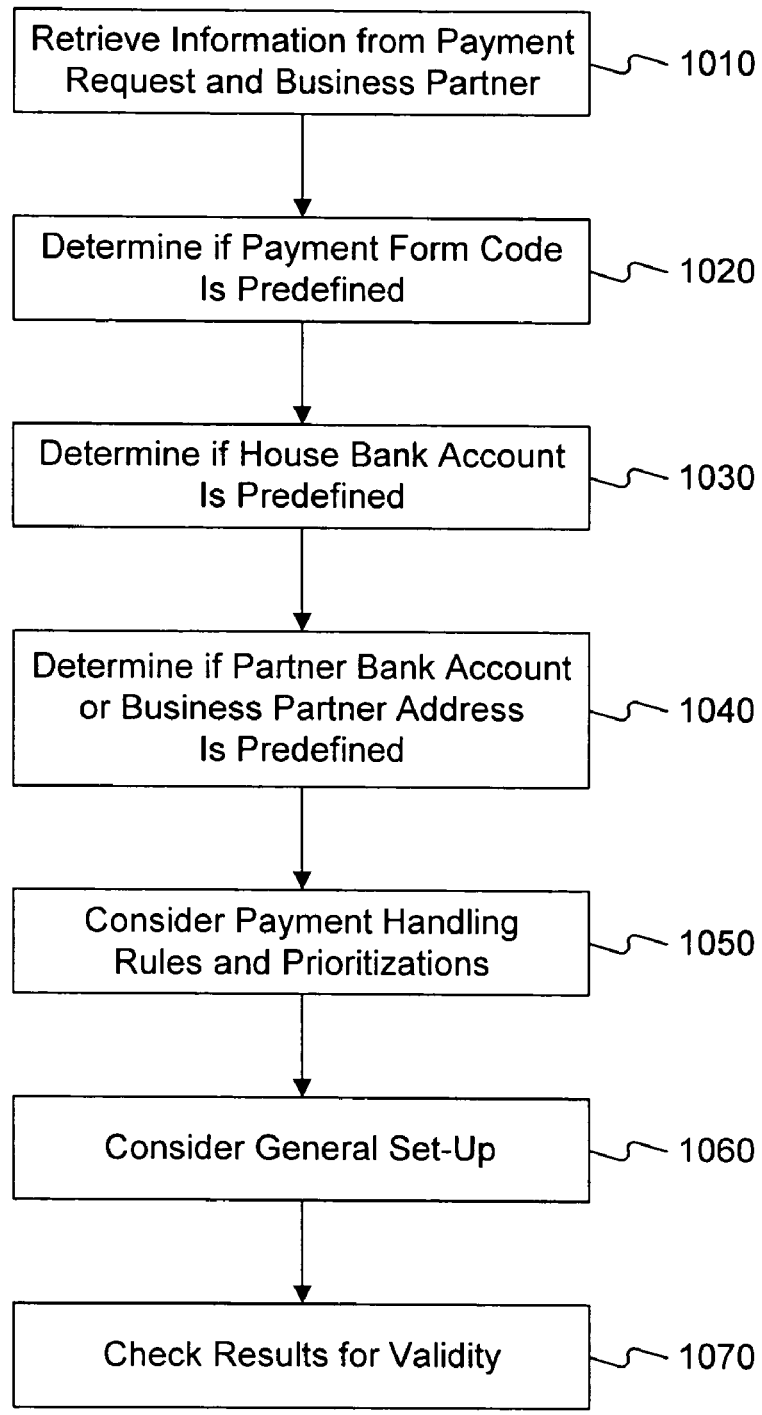
FIG. 10 illustrates a flowchart of an exemplary method for determining a house bank account and payment procedure, consistent with an embodiment of the present invention.

FIG. 10 illustrates a flowchart of an exemplary method for determining a house bank account and payment procedure, consistent with an embodiment of the present invention.

At step 1010, automated payment system 150 may retrieve information from the payment request and business partner 120. The payment request should include the company 110 and business partner 120 that are part of the payment (i.e, sending and receiving payment). The payment request may also include, for example, the payment form code 410, a bank account to pay the invoice to, and a reference to a bank connection of a business partner. The reference to a bank connection of a business partner may be, for example, an address of the business partner that will receive the check, and may also indicate the account information of the bank that will receive the payment. If the payment request does not specify the payment form code 410, bank accounts to use in the transaction, or a reference to a business partner bank connection or postal address of a business partner, this information may be supplied automatically by automated payment system 150.

While retrieving the information, automated payment system 150 may check to see if the business partner is blocked from receiving payments, and, if the business partner is blocked, refuse to make a payment. Companies may define which business partners 120 to block and refuse payment requests based on experience.

In addition to retrieving information from the payment request, automated payment system 150 may also retrieve stored information regarding the connection with business partner 120. For example, with reference to FIG. 8, automated payment system may retrieve information stored regarding business partner 120, named BP0001 (item 850). This information may include house bank account 730, currency type 810, limits, and default payment procedures 505. Central data storage may be provided by company 110 to store the necessary data to complete a payment request.

At step 1020, automated payment system 150 may determine if the payment form code 410 is predefined by the payment request or business partner 120. If there is a payment form code 410 identified in the payment request, automated payment system 150 may use this payment form code 410. However, if the payment request does not specify payment form code 410, automated payment system 150 may determine if payment form codes 410 are stored for business partner 120 as described in step 1050.

At step 1030, automated payment system 150 may determine if the house bank account 730 is predefined. The payment request may identify a house bank account 730 to use for the transaction. If the payment request does identify a house bank account 730, then the identified house bank account may be used for the transaction. If the payment request does not identify a house bank account 730 to use, the house bank account 730 may be set as a wildcard, and may chosen by automated payment system 150 based on prioritizations, as described below.

At step 1040, automated payment system 150 may determine if the business partner bank account or business partner address is predefined. Automated payment system 150 may determine if the business partner bank account, or the business partner address, is required for the selected payment form code 410. For example, bank transfers 460 and direct debits 480 (FIG. 4) may require the partner bank account to be known. Checks 470 that will be mailed require the business partner postal address to be known. Determination of whether the business partner bank account and business partner address are predefined will be described with reference to FIGS. 11, 12, 13, and 14.

At step 1050, automated payment system 150 may consider payment handling rules and prioritizations. If any of the payment procedure, house bank account, and bank connection (account or address) are not predefined by the payment request, automated payment system 150 may consider the payment handling rules and prioritizations. In this manner, automated payment system 150 may process payment requests without requiring additional configuration by a user.

Payment handling rules and prioritizations may be used to complete a payment where information is not specified by the payment request. For example, the payment request may not specify the payment form code 410. Automated payment system 150 may store payment form codes 410 as part of a specific payment procedure 505. In addition, a general payment form code 410 may be assigned to one or more special payment procedures. For example, as seen in FIG. 8 at item 850, business partner 120 BP0001 should be paid with a check, while all business partners 120 that should be paid with currency 810 from the United States may be paid with any payment form code 410, as indicated by the wildcard *. For business partners 120 that may be paid with any payment form code 410, automated payment system 150 may choose a payment form code 410 from FIG. 4 that is preferred for company 110 (FIGS. 5, 6, and 7).

If the payment request does not specify payment form code 410, and the payment form code 410 is not stored for business partner 120, then automatic payment may not be possible. Alternatively, automated payment system 150 may default to a payment form code 410, such as a check 470 (FIG. 4).

Automated payment system 150 may retrieve from the resulting payment request information including, for example, the amount to be paid or received, the currency 810, the direction of the payment (incoming or outgoing), and the determined values for payment form code 410 and house bank account 730. Memory may be provided at a server implementing automated payment system 150, at a distributed location such as accounting system 130, or at a plurality of locations. If the payment request originates in a different system, a duplicate entry may be stored in automated payment system 150 for company 110. With the payment form code 410, house bank account 730, and business partner bank account and/or business partner address selected, automated payment system 150 may customize the payment procedure 505. Users may configure rules that customize, for example, the selection of house bank accounts 730, selection of business partner bank accounts, and selection of payment procedures 505.

For example, the user may define amounts and currencies that may be used to determine a payment procedure and/or house bank account to use for a payment request. Users may also specify which house bank account 730 to use for a specified business partner 120. Accordingly, to determine a payment procedure 505, house bank account 730, business partner bank account, and business partner address, automated payment system 150 may consider both the predefined values of the payment request or business partner, as well as the rules, prioritizations, and general set-up, both as defaults and as specified by users. Consideration of payment handling rules and prioritizations will be further described with reference to FIG. 15.

At step 1060, automated payment system 150 may consider the general set-up. The general set-up may be considered while analyzing payment handling (step 1050). Users may define general set-up rules to be considered in selection of payment handling, which allow customization of the selection of bank accounts and payment procedures 505 to use for payment requests. For example, a user may define a general set-up rule that automated payment system 150 attempt to choose the same bank for house bank 115 and business partner bank 125. In this manner, company 110 and business partner 120 may reduce transaction costs associated with performing transactions between different banks. Also, a user may specify that automated payment system 150 choose the same bank group for house bank 115 and business partner bank 125, to similarly reduce transaction costs. A bank group may be a group of banks that have a common agreement for handling transactions. If a user has not established a general set-up, then step 1050 may be omitted.

As an example of a general set-up regarding bank selection, if a European bank transfer 770 (FIG. 7) is selected as the payment procedure 505, automated payment system 150 may try to select a bank account of business partner 120 that is of the same bank as house bank account 730 DRE. If a domestic bank transfer 740 is selected as the payment procedure 505, no specific house bank account 730 is identified (FIG. 7, payment procedure 740), so automated payment procedure may check for further sub-prioritizations. As seen at domestic bank transfer 750, house bank account DRE 002 may be defined with a sub-priority of P1, so automated payment system 150 will determine if business partner 120 has a business partner bank account with bank DRE. If business partner 120 does not have a bank account with DRE, automated payment system may check the next domestic bank transfer in table 700, which is domestic bank transfer 760 having a sub-priority of P1. Automated payment system 150 will then determine if business partner 120 has a business partner bank account 125 with house bank account 730 SPK.

Users may also establish liquidity requirements for the general set-up of house bank accounts 730. A liquidity requirement may identify, for example, amounts and types of currency that may be used for payment requests. For example, automated payment system 730 may ensure that there are sufficient funds in a selected bank account to cover the payment request. Users may configure a minimum and a maximum amount to be held in a given house bank account 730, and the transaction may be refused or deferred to another account if the minimum or maximum are exceeded. A prioritized list may be created which may be used in determining whether the available payment handling procedures meet the general set-up.

At step 1070, automated payment system 150 may check the results of the bank determinations and payment handling for validity. Automated payment system 150 may check the allowed currency for a house bank account (FIG. 8), check whether a rule exists for the amount specified by the payment request, and consider payment handling to ensure that the resulting combinations are valid.

In one embodiment, automated payment system 150 may select payment handling procedures using the currency type identified by the payment request, amount of payment requested, and/or business partner. For example, as represented in FIG. 8, if the payment request has an amount between 1000 and 5000 EUR, house bank account 730 SPK 0007 may be selected for handling the payment request. Automated payment system 150 may then determine if house bank account 730 SPK 0007 contains sufficient funds to handle the payment request and ensure that processing the payment request using house bank account 730 SPK 0007 would not place the account balance above or below predefined amounts. As another example, if the payment request specifies business partner 120 BP0001 and has a currency 810 of USD, then house bank account 730 SPK 0007 may be used.

More than one type of currency may be specified for a house bank account, as illustrated by house bank account SPK 0007, which allows U.S. currency 810 and European currency 810. If the currency 810 selected for the payment is not supported by the selected house bank account 730, automated payment system 150 may refuse the transaction, or select a different house bank account 730 to use for the transaction.

Results may also be invalid if the amount of a transaction does not fall within a currency range specified for the selected house bank account 730. For example, as illustrated in FIG. 8, the use of house bank account SPK 0007 with currency 810 of Europe must be above the minimum 820 of 1000 and below the maximum 830 of 5000. If a payment request fits within the parameters of these ranges, then the appropriate house bank account 730, in this example SPK 0007, may be selected for the payment request without considering the additional prioritizations provided by payment handling. If the payment request is not within the parameters of these ranges, automated payment system 150 may attempt to determine an alternative payment procedure 505 for the payment request using, for example, a different house bank account 730, a different type of currency 810, whether business partner 120 is blocked from transactions, and whether an outgoing payment would exceed an overdraw limit.

Moreover, automated payment system 150 may check the results to ensure that the countries and country groups are valid for the transaction, as described with reference to FIG. 16. Automated payment system 150 may also check the combination of values to ensure that the selected combination is valid. For example, automated payment system 150 may ensure that the combination of the payment procedure 505, currency 810, country of house bank account, and country of business partner bank account is a valid combination. Automated payment system 150 may also check the selected combination of payment procedure 505, house bank account 730, and business partner account or address to ensure that the combination is valid.

Further, automated payment system 150 may use a pre-notification, which may be required by some countries. A pre-notification may be the process of sending a test payment with an amount of zero to verify that the provided bank account information is accurate. If the payment procedure selected requires pre-notification and the test payment has not been sent to verify the bank account information, then the automated payment may be invalid and refused. Alternatively, automated payment system 150 may search for another payment procedure to use for the payment request.

Automated payment system 150 may also allow manual checks for validity by a user, such as by giving a proposal list to a user for confirmation. Users may also select between different valid combinations that automated payment system 150 generates. Further, automated payment system 150 may notify a user of any errors in the configuration of payment procedures 505 and bank accounts. The resulting combination of payment procedure 505, business partner bank account or address, house bank account 730, and other selected parameters may be stored in memory with information about the transaction, such as the payment form code 410, overdraw limits, minimum and maximums for the house bank account, and totals for the transaction.

Figure 11:
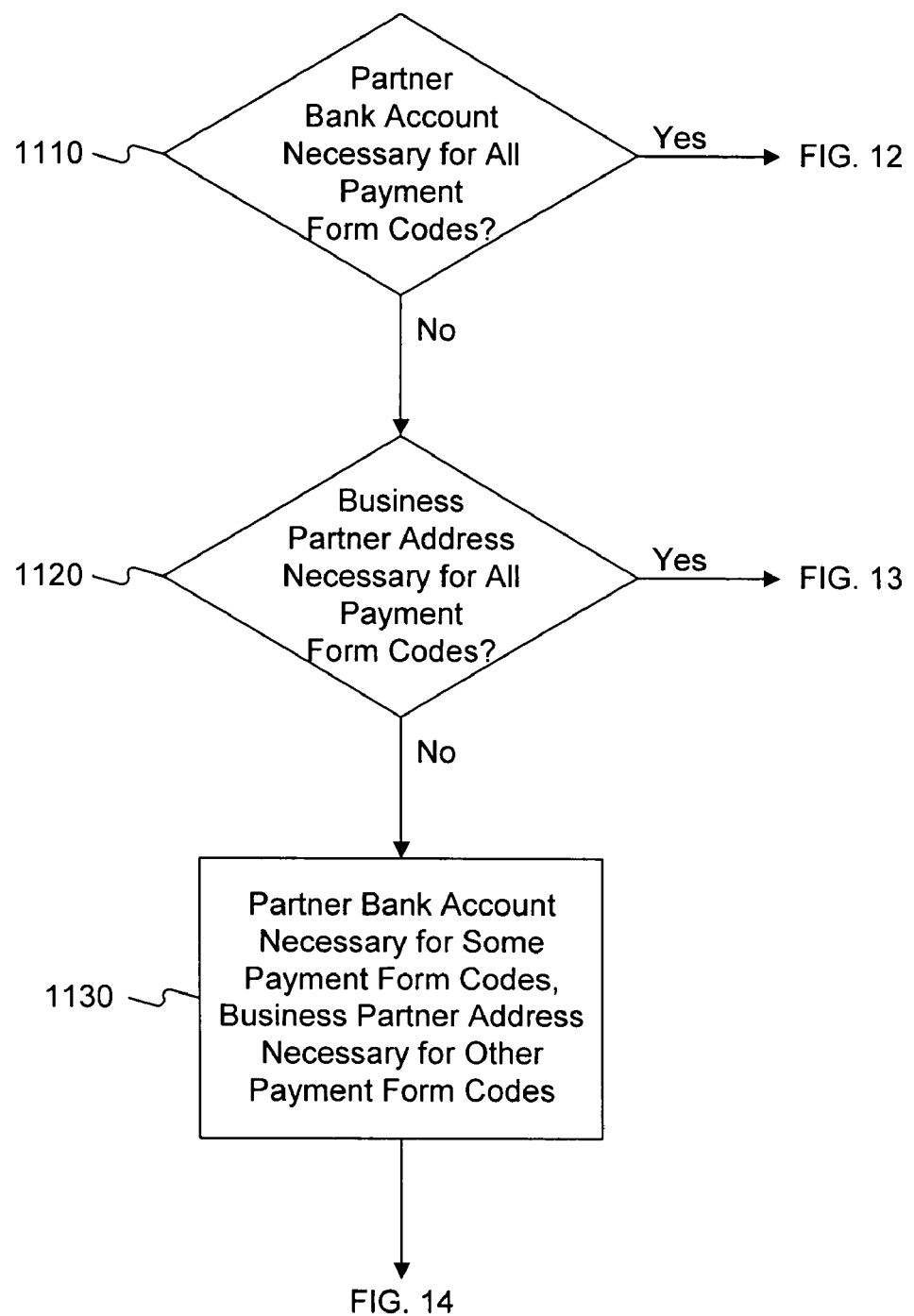
FIG. 11 illustrates a flowchart of an exemplary method for determining whether a business partner bank account and a business partner address are predefined, consistent with an embodiment of the invention.

FIG. 11 illustrates a flowchart of an exemplary method 1100 for determining whether a business partner bank account and business partner address are predefined, consistent with an embodiment of the invention.

At step 1110, automated payment system 150 may determine if the partner bank account is necessary for all payment form codes 410. The payment form codes 410 may be chosen as described in FIG. 10 (step 1020). As seen in FIG. 4, if the only chosen payment form code 410 is bank transfer 460, a partner bank account is mandatory. In this example, the partner bank account is mandatory for all payment form codes 410 available for the payment request, and the method will proceed to select a partner bank account as described in FIG. 12 below. However, if the payment may be made using, for example, either a check 470 or a bank transfer 460, then the business partner bank account is not necessary for all payment form codes 410, because check 470 payment may be made by regular mail. As such, the method will proceed to step 1120.

At step 1120, automated payment system 150 may determine if the business partner address is necessary for all payment form codes 410. For example, if the only payment form code 410 is check 470, then the business partner bank address is necessary for all payment form codes 410. In this example, the method may proceed to select a business partner address as described in FIG. 13. However, if the business partner bank address is not mandatory for all payment form codes 410, such as if the payment form code 410 may be either a check 470 or a direct debit 480, the method may proceed to step 1130.

At step 1130, the partner bank account is necessary for some payment form codes 410, and the business partner address is necessary for other payment form codes 410. Automated payment system 150 may determine the payment form code 410 to select as described in FIG. 14.

Figure 12:
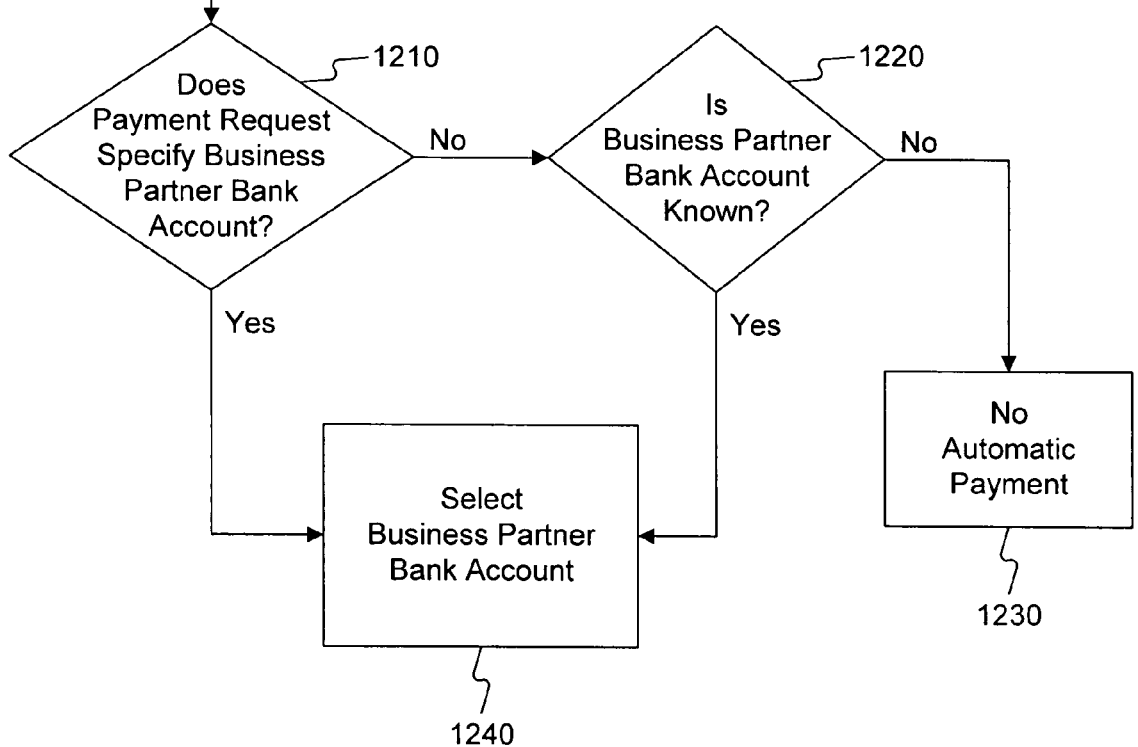
FIG. 12 illustrates a flowchart of an exemplary method for determining a business partner bank account when a business partner account is mandatory for the available payment form codes, consistent with an embodiment of the invention.

FIG. 12 illustrates a flowchart of an exemplary method 1200 for determining a business partner bank account when a business partner account is mandatory for all payment form codes 410, consistent with an embodiment of the invention.

At step 1210, automated payment system 150 may determine if the payment request specifies a business partner bank account to use for the transaction. If the payment request does specify the business partner bank account, automated payment system 150 may use this account for the transaction (step 1240).

However, if the payment request does not specify a business partner bank account, automated payment system 150 may determine if a business partner bank account is known (step 1220). Automated payment system 150 may retrieve a list of business partner bank accounts from memory, for example, in a central data storage of automated payment system 150.

If there are no bank accounts stored for the business partner identified in the payment request, no automatic payment may be made because the available payment form codes 410 all require a business partner account, but no business partner account is known by automated payment system 150 (step 1230). However, if there is a business partner bank account in memory, automated payment system 150 may select this account for the transaction (step 1240).

Figure 13:
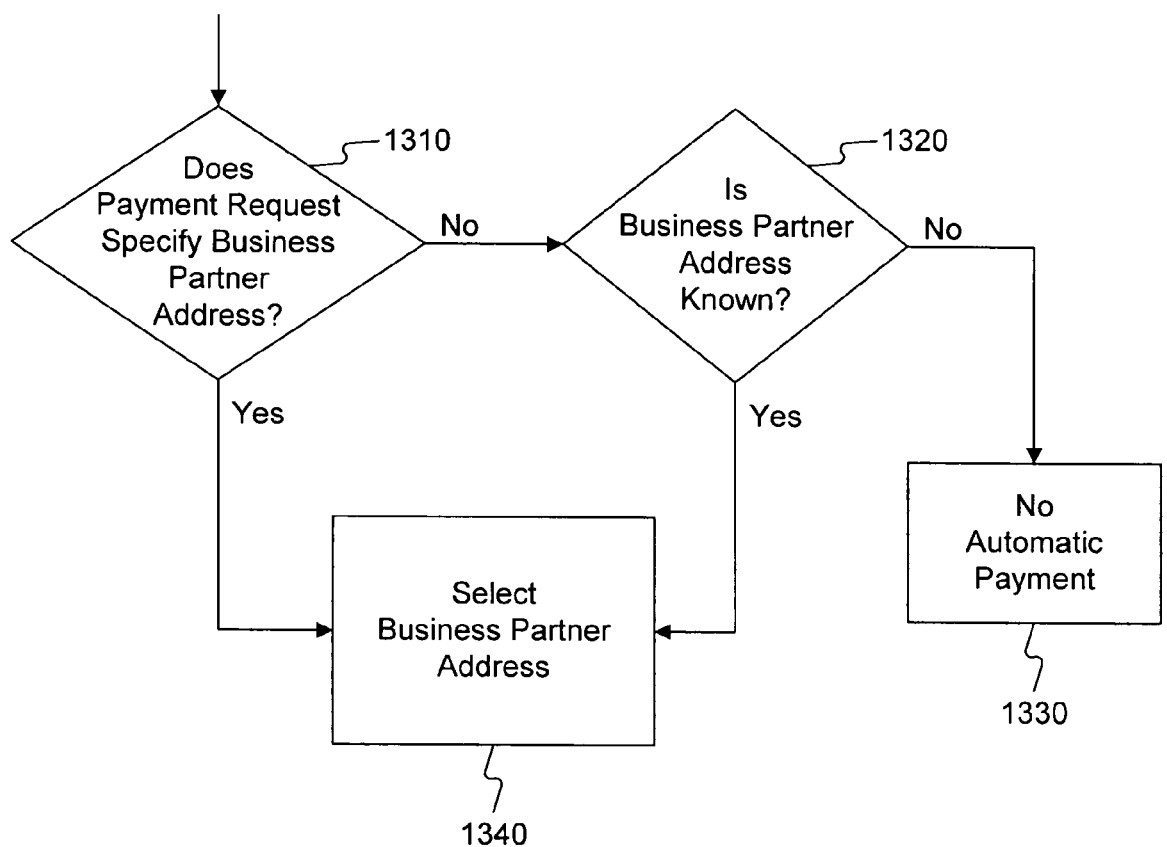
FIG. 13 illustrates a flowchart of an exemplary method for determining a business partner address when the business partner address is mandatory for available payment form codes, consistent with an embodiment of the invention.

FIG. 13 illustrates a flowchart of an exemplary method 1300 for determining a business partner address when the business partner address is mandatory for all payment form codes 410, consistent with an embodiment of the invention.

At step 1310, automated payment system 150 may determine if the payment request specifies a business partner address. If the payment request does specify the business partner bank address, automated payment system 150 may use this address for the transaction (step 1340).

If no business partner address is specified by the payment request, automated payment system may determine if the business partner address is known (step 1320). Automated payment system 150 may retrieve a list of business partner bank addresses from memory, for example, in a central data storage of automated payment system 150.

If there is not an address the business partner identified in the payment request, no automatic payment may be made because the payment form codes all require a business partner address, but no business partner address is known by automated payment system 150 (step 1330). However, if there is a business partner bank address in memory, automated payment system 150 may select this address for the transaction (step 1340).

Figure 14:
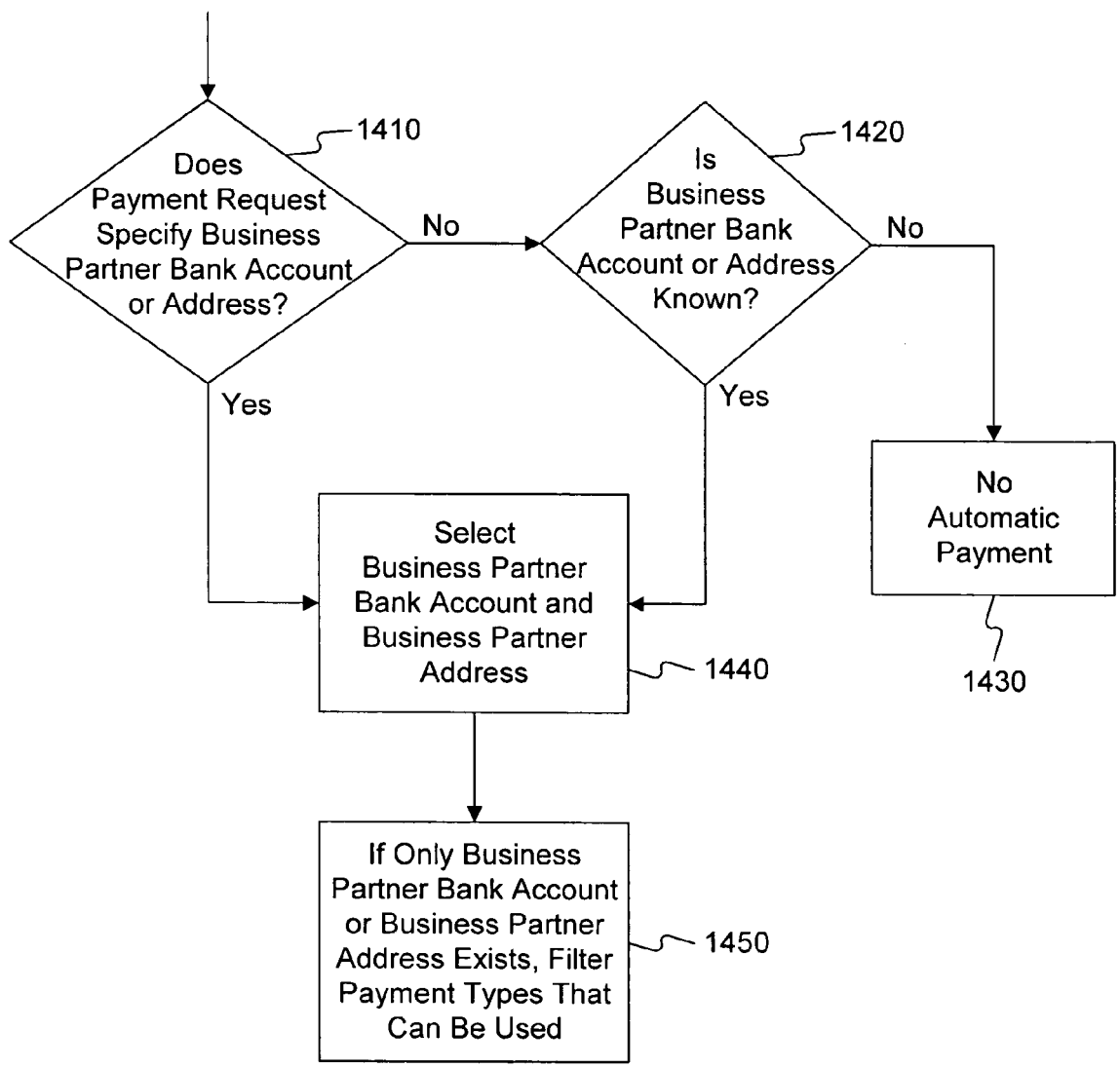
FIG. 14 illustrates a flowchart of an exemplary method for choosing business partner bank account and/or a business partner address, consistent with an embodiment of the invention.

FIG. 14 illustrates a flowchart of an exemplary method 1400 for choosing business partner bank account and/or a business partner address, consistent with an embodiment of the invention.

At step 1410, automated payment system 150 may determine if the payment request specifies the business partner bank account or business partner address. If the payment request does not specify either the business partner account or the business partner address, automated payment system 150 may determine at step 1420 if the business partner account or business partner address are known by retrieving this information from memory as described above.

At step 1430, if neither the business partner account nor the business partner address are specified in the payment request or in memory, no automatic payment request 1430 is possible because automated payment system 150 cannot determine how to pay business partner 120.

However, if one or both of the business partner bank account and business partner address are specified by the payment request, automated payment system may choose these to use in the transaction (step 1440). Also, if either, or both, of the business partner account and business partner address are known in memory, automated payment system 140 may choose these to use in the transaction (step 1440).

At step 1450, automated payment may filter the payment form codes that can be used if only a business partner bank account or business partner address has been determined. For example, if payment form codes include bank transfer 460 (FIG. 4) and check 470, but only a business partner bank account can be identified, then check 470 payment will be removed from the list of available payment form codes for this payment request. In this manner, automated payment system 150 may ensure that the payment form code 410 may be performed using the information known about the business partner 120 making the payment request.

Figure 15:
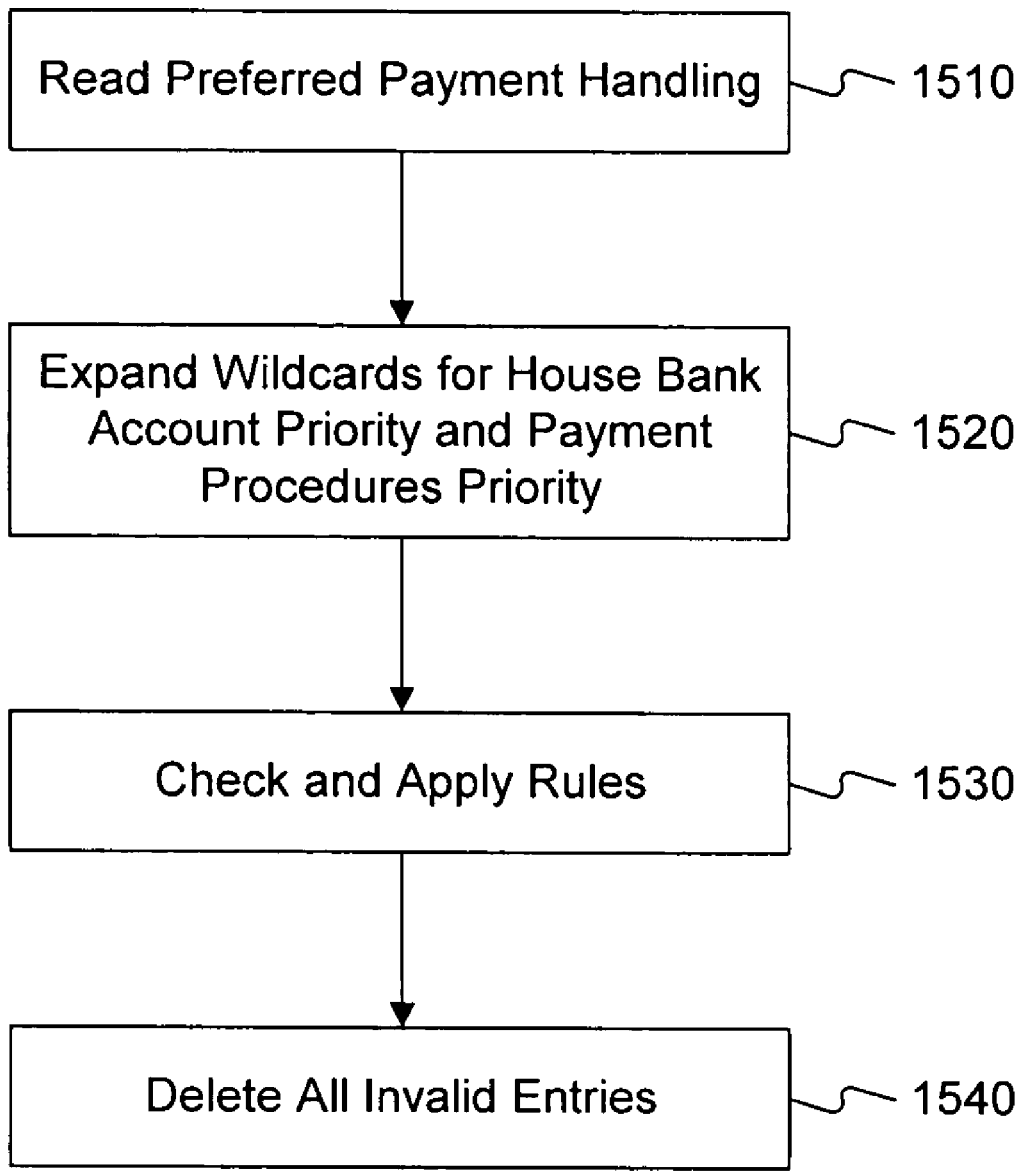
FIG. 15 illustrates a flowchart of an exemplary method for considering payment handling rules and prioritizations, consistent with an embodiment of the invention.

FIG. 15 illustrates a flowchart of an exemplary method 1500 for considering payment handling rules and prioritizations, consistent with an embodiment of the invention. To consider the payment handling rules, automated payment system 150 may use the information in a payment request, including the direction of a payment (incoming or outgoing), the amount of a payment, the currency for a payment, the business partner 120, and preferred values for payment form code 410 and house bank account 730. Automated payment system 150 may also use lists with prioritizations and, optionally, sub-prioritizations of payment procedures 505 for payment form codes 410 and house bank accounts 730. The lists with prioritizations and sub-prioritizations may be formed based on configuration rules (FIGS. 3-8). For example, prioritizations for payment procedures may be done based on the accounts of a business partner 120. Prioritization of house bank accounts 730 may be done implicitly by automated payment system 150 by, for example, using countries 320 and country groups 310 (FIG. 3). If multiple payment form codes 410 are defined with a different payment direction, automated payment system 150 may consider only payment form codes 410 having the direction of the payment request (incoming or outgoing).

In addition, the combination of payment procedures 505 and house bank accounts 730 may be prioritized. For example, domestic bank transfers may be prioritized above international bank transfers, and a house bank account may be prioritized for each payment procedure, as described above (FIG. 7).

At step 1510, automated payment system 150 may read the preferred payment handling. Preferred payment handling may be stored in a table format, such as illustrated in FIGS. 5-8.

At step 1520, automated payment system 150 may expand wildcards in the preferred payment handling table according to house bank account 730 priority and payment procedures priority, as described with reference to FIGS. 7, 8, and 10.

At step 1530, automated payment system 150 may check and apply rules to the combination selected in step 1520. The combination may be checked for validity after reading each line in the preferred payment handling table, or after processing the entire table. If automated payment system 150 checks and applies rules after each line in the preferred payment table, the process described above in step 1070 (FIG. 10) may be performed following each line. Otherwise, step 1530 may be performed once as described in step 1070 (FIG. 10).

At step 1540, automated payment system 150 may delete all invalid entries. Invalid entries may be payment procedures that violate rules, such as violating liquidity requirements or country groups (FIG. 16). As such, automated payment system 150 may ensure that the payment request is not processed in a manner that will cause an error.

Figure 16:
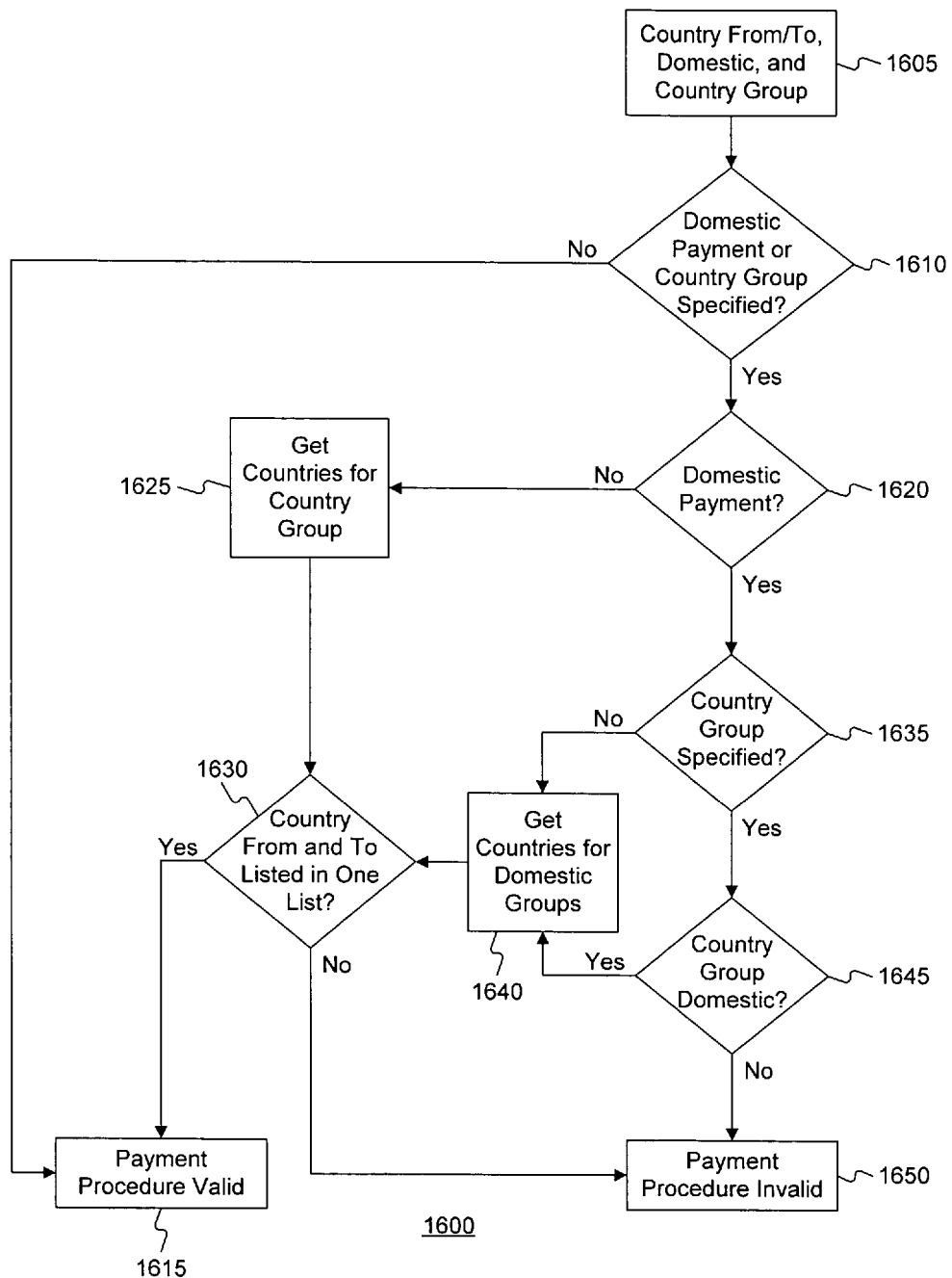
FIG. 16 illustrates a flowchart of an exemplary method for determining if a selected payment procedure is valid, consistent with an embodiment of the invention.

FIG. 16 illustrates a flowchart of an exemplary method 1600 for determining if the payment procedure is valid based on countries and country groups, consistent with an embodiment of the invention.

At step 1605, automated payment system 150 may retrieve the country that a payment is going to (incoming), the country that a payment is coming from (outgoing), the country groups these countries belong to, whether the payment procedure is a domestic bank transfer, the business partner, or preferred payment procedures defined by a user.

At step 1610, automated payment system 150 may determine if the payment procedure 505 is a domestic payment 330 or if the country group (515, 520) is specified. If the payment procedure 505 is not domestic 330 (FIG. 5), and the country group is not specified, then the payment procedure is valid (step 1615). However, if the payment procedure is a domestic payment 330 or if a country group (515, 520) is specified, then method 1600 may continue to step 1620.

At step 1620, automated payment system 150 may determine if a domestic payment 330 is requested. If a domestic payment 330 is not requested, at step 1625, automated payment system 150 may retrieve the countries 320 for the specified country group 310 (FIG. 3). Next, at step 1630, automated payment system 150 may determine if the country 515 that the payment is coming from (outgoing) is within the same country group 310 as the country 520 to which the payment is going to (incoming). If the incoming and outgoing counties 320 are within a country group 310, the payment procedure is valid (step 1615).

If at step 1620 automated payment system determines that a domestic payment 330 is requested, at step 1635, automated payment system 150 may determine if a country group 310 is specified. If a country group 310 is not specified, at step 1640, automated payment system 150 may get the countries 320 for domestic groups 330 (e.g., country group 370 DOM-CH in FIG. 3). If the countries 320 for the incoming and outgoing are within a domestic group (e.g., Switzerland and Liechtenstein FIG. 3) (step 1630), the payment procedure is valid (step 1615).

However, if the country group 310 is specified at step 1635, at step 1645 automated payment system 150 may determine if the country group 310 is domestic 330. If the country group 310 is domestic 330 (e.g., country group 370 FIG. 3), automated payment system 150 may proceed to step 1640 as described above. However, if the country group 310 is not domestic 330, but a domestic payment 330 was requested (step 1620), and the country group 310 was specified (step 1635), then the payment procedure 505 is invalid (step 1650).

Returning to step 1630, if the incoming country (520) and outgoing country (515) are not within the same country group 310 (from step 1625), or the same domestic group 330 (from step 1640), then the payment procedure 505 is invalid (step 1650).

Payment requests that are generated or received may be tracked by automated payment system 150, and removed upon completion. For example, received payment requests may be placed in a queue and removed as they are processed. Automated payment system 150 may be configured to allow a minimum or maximum number of payment requests to be processed in a given time period to increase system performance. Once the payment requests are processed, or during processing of the payment requests, automated payment system 150 may notify accounting 130 to ensure that proper business records are maintained.

Users of automated payment system 150 may be provided a user interface to interact with the system. Users may be given different levels of access depending on the status of a user. For example, a standard user may be allowed to check the current configuration of automated payment system 150 and maintain preferred payment handling. An advanced user may be given the access of a standard user, and in addition be allowed to verify and maintain rules using a wizard. An expert user may be given the access of an advanced user, and in addition be allowed to maintain all settings including payment form codes and payment procedures, such as the prioritization of house bank accounts. While described as a standard user, advanced user, and expert user, additional levels of access and scopes of control may be provided as appropriate.

Moreover, users may be allowed to simulate the configuration to ensure proper configuration, which allows a user to identify and correct any improper settings before receiving a payment request. After a user configures a new set of rules, the user may wish to simulate the affect of their rules on automated payment system 150. For example, a simulation may indicate to a user that the combination of a payment procedure and house bank account is not allowed for a certain business partner.

Automated payment system 150 may also enable users to track why a payment procedure and house bank account were chosen, by storing an application log. The application log may allow a user to determine, for example, why an automatic payment was not possible.

Each automated payment system 150 may be implemented using one or more servers. Moreover, automated payment system 150 may be incorporated into other forms of payment processing software, server applications, and the like. In one embodiment, automated payment system 150 may process payment requests in an order specified by a user, such as processing all payment requests from a preferred business partner before other business partners.

The systems and methods disclosed herein may be embodied in various forms including, for example, a data processor, such as a computer that also includes a database, digital electronic circuitry, memory, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention will be apparent to those skilled in the art from consideration of the specification and practice of embodiments and features of the invention disclosed herein. It is intended, therefore, that the specification and embodiments be considered as exemplary only, with a true scope and spirit of the invention being indicated by the following claims.

What is claimed is:

1. A computer-implemented method for processing of a payment request, comprising:
   determining, using a processor, an entity that will receive a payment based on the payment request;
   determining, using the processor, an outgoing bank account to use for the payment;
   automatically selecting, from a list of available payment procedures, a preferred payment procedure for the payment request, the preferred payment procedure indicating a predefined payment form code and a connection with the entity;
   validating the preferred payment procedure using a set of rules, the set of rules defining whether the preferred payment procedure may be selected based on at least one of:
      available payment form codes for the entity and the outgoing bank account;
      an amount of currency requested in the payment request;
      a type of currency requested in the payment request; and
      whether the payment request may be performed using the connection; and
   paying, to the entity, the payment using the validated payment procedure.

2. The method of claim 1, wherein the connection with the entity comprises at least one of a bank account and a postal address.

3. The method of claim 1, further comprising:
   grouping a plurality of payment requests to form a grouped payment request; and
   processing the grouped payment request as a single payment request.

4. The method of claim 1, wherein determining the outgoing bank account comprises selecting, from a prioritized list of outgoing bank accounts, a preferred outgoing bank account.

5. The method of claim 4, wherein the prioritized list comprises at least one of a list of outgoing bank accounts prioritized based on the entity, and a list of outgoing bank accounts prioritized based on the payment procedure.

6. The method of claim 1, wherein automatically selecting the preferred payment procedure further comprises:
   obtaining information from the payment request; and
   determining if the information defines the predefined payment form code, defines the outgoing bank account, and identifies the connection to use for executing the payment request.

7. The method of claim 1, wherein selecting the preferred payment procedure further comprises:
   determining a first location of the entity, the first location comprising at least one of a first country and a first country group;
   determining a second location of the outgoing bank account, the second location comprising at least one of a second county and a second country group.

8. The method of claim 7, further comprising selecting a least expensive payment procedure between the first location and the second location.

9. The method of claim 1, wherein the set of rules further includes a location of the entity and a location of the outgoing bank account.

10. A computer-readable medium that stores a set of instructions which, when executed by a processor, performs a method for processing a payment request, the method comprising:
    determining, using the payment request, an entity that will receive a payment;
    determining an outgoing bank account to use for the payment;
    automatically selecting, from a list of available payment procedures, a preferred payment procedure for the payment request, the preferred payment procedure indicating a predefined payment form code and a connection with the entity;
    validating the preferred payment procedure using a set of rules, the set of rules defining whether the preferred payment procedure may be selected based on at least one of:

available payment form codes for the entity and the outgoing bank account;
an amount of currency requested in the payment request;
a type of currency requested in the payment request; and
whether the payment request may be performed using the connection; and paying, to the entity, the payment using the validated payment procedure.

11. The computer-readable medium of claim 10, wherein the connection with the entity comprises at least one of a bank account and a bank address.

12. The computer-readable medium of claim 10, further comprising:
grouping a plurality of payment requests to form a grouped payment request; and
processing the grouped payment request as a single payment request.

13. The computer-readable medium of claim 10, wherein determining the outgoing bank account comprises selecting, from a prioritized list of outgoing bank accounts, a preferred outgoing bank account.

14. The computer-readable medium of claim 13, wherein the prioritized list comprises at least one of a list of outgoing bank accounts prioritized based on the entity, and a list of outgoing bank accounts prioritized based on the payment procedure.

15. The computer-readable medium of claim 10, wherein automatically selecting the preferred payment procedure further comprises:
obtaining information from the payment request; and
determining if the information defines the predefined payment form code, defines the outgoing bank account, and identifies the connection to use for the payment request.

16. The computer-readable medium of claim 10, wherein selecting the preferred payment procedure further comprises:
determining a first location of the entity, the first location comprising at least one of a first country and a first country group;
determining a second location of the outgoing bank account, the second location comprising at least one of a second county and a second country group.

17. The computer-readable medium of claim 16, further comprising selecting a least expensive payment procedure between the first location and the second location.

18. The computer-readable medium of claim 10, wherein the set of rules further includes a location of the entity and a location of the outgoing bank account.

19. A system for processing a payment request, the system comprising:
means for determining, using the payment request, an entity that will receive a payment;
means for determining an outgoing bank account to use for the payment;
means for automatically selecting, from a list of available payment procedures, a preferred payment procedure for the payment request, the preferred payment procedure indicating a predefined payment form code and a connection with the entity;
means for validating the preferred payment procedure using a set of rules, the set of rules defining whether the preferred payment procedure may be selected based on at least one of:
available payment form codes for the entity and the outgoing bank account;
an amount of currency requested in the payment request;
a type of currency requested in the payment request; and
whether the payment request may be performed using the connection; and
means for paying, to the entity, the payment using the validated payment procedure.

20. The system of claim 19, further comprising:
means for determining the outgoing bank account by selecting, from a prioritized list of outgoing bank accounts, a preferred outgoing bank account, wherein the prioritized list comprises:
at least one of a list of outgoing bank accounts prioritized based on the entity, and
a list of outgoing bank accounts prioritized based on the payment procedure;
means for determining a first location of the entity, the first location comprising at least one of a first country and a first country group; and
means for determining a second location of the outgoing bank account, the second location comprising at least one of a second county and a second country group.

* * * * *

UNITED STATES PATENT AND TRADEMARK OFFICE
CERTIFICATE OF CORRECTION

PATENT NO. : 7,587,364 B2  Page 1 of 1
APPLICATION NO. : 11/387919
DATED : September 8, 2009
INVENTOR(S) : Crumbach et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 750 days.

Signed and Sealed this

Twenty-first Day of September, 2010

David J. Kappos
*Director of the United States Patent and Trademark Office*